(12) United States Patent
Kaufmann

(10) Patent No.: US 7,082,708 B2
(45) Date of Patent: Aug. 1, 2006

(54) METHOD FOR REMOVING COATING DAMAGES AND/OR EROSION DAMAGES

(75) Inventor: Stefan Kaufmann, Celle (DE)

(73) Assignee: Rheinmetall W & M GmbH, Unterluess (DE)

( * ) Notice: Subject to any disclaimer, the term of this patent is extended or adjusted under 35 U.S.C. 154(b) by 0 days.

(21) Appl. No.: 10/865,778

(22) Filed: Jun. 14, 2004

(65) Prior Publication Data

US 2005/0066568 A1      Mar. 31, 2005

(30) Foreign Application Priority Data

Jun. 25, 2003  (DE)  ................. 103 28 450

(51) Int. Cl.
*F41A 21/22*  (2006.01)
(52) U.S. Cl. ...................................... 42/76.1
(58) Field of Classification Search ............... 42/76.1, 42/76.01, 76.02; 427/449; 89/14.05, 16
See application file for complete search history.

(56) References Cited

U.S. PATENT DOCUMENTS

| 3,780,465 A | * | 12/1973 | Polcha ..................... 148/565 |
| 4,365,136 A | * | 12/1982 | Gottlieb ................. 219/121.65 |
| 4,469,532 A | * | 9/1984 | Nicolas ..................... 148/279 |
| 5,125,780 A | * | 6/1992 | Budenbender .................. 413/4 |
| 5,496,593 A | * | 3/1996 | Tsai et al. ................... 427/556 |
| 5,554,415 A | * | 9/1996 | Turchan et al. ............ 427/248.1 |
| 5,601,735 A | * | 2/1997 | Kawamoto et al. ..... 219/121.63 |
| 6,040,551 A | * | 3/2000 | Manz et al. ............ 219/121.65 |
| 6,511,710 B1 | | 1/2003 | Warnecke |
| 6,548,125 B1 | * | 4/2003 | Warnecke .................. 427/597 |
| 2002/0114899 A1 | | 8/2002 | Warnecke |
| 2002/0185973 A1 | * | 12/2002 | Jackson et al. ............. 313/607 |

FOREIGN PATENT DOCUMENTS

| DE | 3022099 A1 | 12/1981 |
| DE | 4007842 A * | 9/1991 |
| DE | 199 19 687.7 | 11/2000 |
| DE | 199 19 687 A1 | 11/2000 |
| DE | 100 41 114 A1 | 3/2002 |
| EP | 1 256 402 A2 | 11/2002 |

* cited by examiner

*Primary Examiner*—Peter M. Poon
*Assistant Examiner*—Bret Hayes
(74) *Attorney, Agent, or Firm*—Marina V. Schneller; Venable LLP

(57) ABSTRACT

The invention relates to a method for repairing coating damage and/or erosion damage on the internal surface of a weapon barrel by overlaying the respectively damaged barrel region with a suitable coating material and, if necessary, reworking it mechanically.

To ensure that coating damages and/or erosion damages on a weapon barrel can be repaired easily, safely and cost-effectively, without resulting in a considerable weakening of the weapon barrel, according to the invention, deposit of the coating material is via overlay welding onto the respectively damaged barrel region.

3 Claims, 1 Drawing Sheet

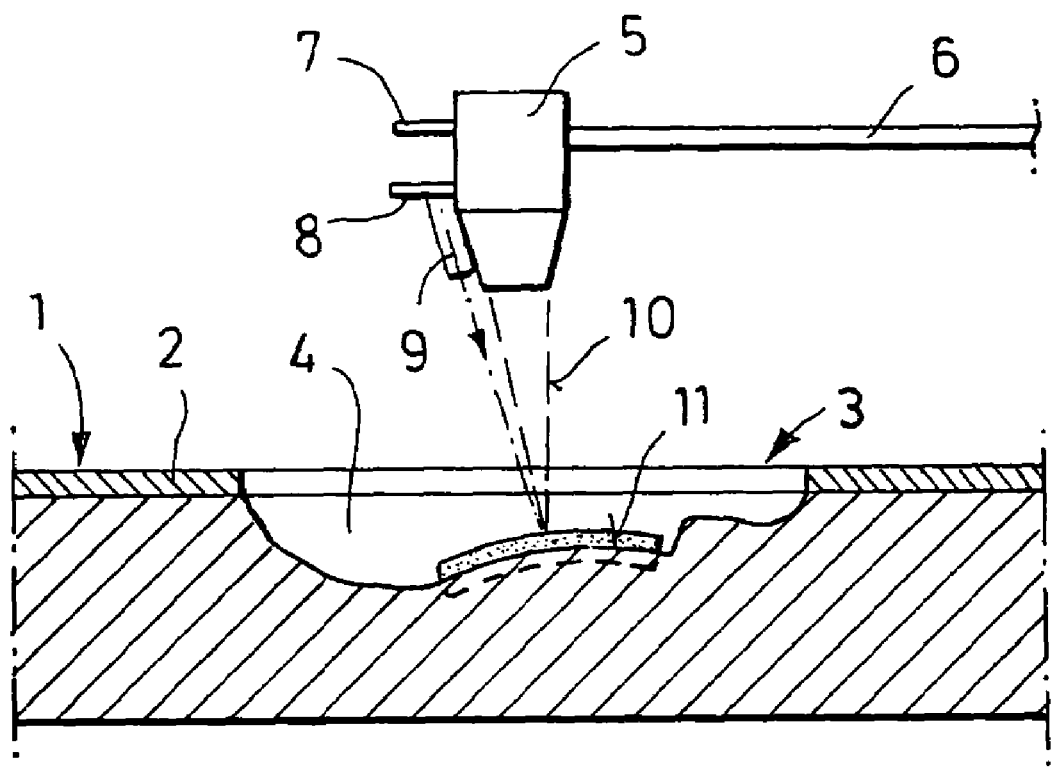

METHOD FOR REMOVING COATING DAMAGES AND/OR EROSION DAMAGES

FIELD OF THE INVENTION

The invention relates to repairing inside surfaces of weapon barrel(s), and particularly to a method for repairing coating damage and/or erosion damage on the inside surface of a weapon barrel by overlaying the respectively damaged barrel region with a suitable coating material and, if necessary, reworking it mechanically.

Weapon barrels made of steel and used for large-caliber barrel weapons, in particular, show high degrees of erosion following the firing of performance-improved ammunition as a result of the high gas temperatures and flow velocities that develop during the firing. As a result of this erosion, the respective weapon barrel shows wear before it reaches the end of its service life due to material fatigue.

Reference DE 100 41 114 A1 relates to a method for repairing the damaged barrel regions with a corresponding coating material corresponding to that of the undamaged barrel, to create a closed and smooth barrel surface. For this, the coating method and the coating material are matched to each other in such a way that the internal barrel surface is locally repaired without causing changes in the metallographic and metallurgical material characteristics of the weapon barrel material. Reference DE 100 41 114 A1 in particular suggests not using a overlay welding technique, which is reported in reference DE 199 19 687.7 for creating a relatively thin, continuous protective layer against erosion wear in the weapon barrel; the reference caveat suggests that a localized melting of the barrel in the damaged regions leads to structural changes, which can result in a weakening of the weapon barrel.

However, it has turned out that with the prior method(s), gaps and/or cracks are not always closed off completely, so that additional and sometimes hidden cracks can form during subsequent use of the weapon barrel, despite the deposited coating material.

It is the object of the present invention to provide a method of the aforementioned type which can be used to repair easily, safely and cost-effectively, weapon barrels that exhibit coating damage and erosion damage, without resulting and noticeable weakening of the weapon barrel.

This object is solved according to the invention with the features disclosed in the claims. Additional and particularly advantageous embodiments of the invention are disclosed in the dependent claims.

SUMMARY OF THE INVENTION

The invention essentially is based on the idea of applying the coating material with the overlay welding technique to the respectively damaged barrel region.

When using the overlay welding technique, a melting bath forms in the surface-region of the weapon barrel, which contains the molten material from the weapon barrel and the coating material and which subsequently hardens, so that the barrel steel and the auxiliary material intimately combine. As a result, a crack that may form the basis for erosion damage is closed off completely. Surprisingly, it has turned out that the structural changes in the surface-region, which are caused by the overlay welding, do not lead to a noticeable weakening of the weapon barrel, at least not if the maximum heat-effect zone in the barrel wall is set to ≦1 mm with a corresponding temperature control.

The overlay welding technique can be used for laser-welding as well as plasma-welding.

The coating material, in the form of a powder, wire or ribbon, can be applied to the damaged inner surface, just prior to exposing the laser beam to the internal surface of the weapon barrel and can be melted by this laser beam.

Further details and advantages of the invention follow from the exemplary embodiment below, which is explained with the aid of a Figure.

DESCRIPTION OF THE DRAWINGS

The invention will be illustrated by reference to the drawing and numbered elements therein.

In FIG. 1 a barrel weapon section 1 has an internal surface coated with a hard-chromium layer 2. The chromium layer 2 has spalled off in the damaged barrel region with reference numeral 3 and the weapon barrel 1 has been damaged by erosion, so that an indentation 4 has developed. Other reference numbers which appear in the Figure are defined as follows:

REFERENCE NUMBER LIST 1 weapon barrel
2 hard-chromium layer
3 damaged barrel region
4 indentation
5 overlay welding head
6 traversing unit
7 pipeline
8 device
9 feeding device
10 laser beam
11 internal surface To repair this indentation 4, the damaged barrel region 3 of the weapon barrel 1 is first cleaned, for example with the aid of sand blasting. An overlay welding head is then inserted into the weapon barrel, wherein the overlay welding head 5 is connected via a traversing unit 6 (e.g., guide rails) with a manipulation (e.g., robotic arm) device, not shown herein for reasons of clarity, for the translatory and rotary movements.

The overlay welding head 5, for example, can be a laser with downstream-connected optic which focuses the laser light onto a section of the damaged barrel region 3. A pipeline 7 for supplying an inert gas is connected to the overlay welding head 5. In addition, the powder, wire, or ribbon-shaped coating material is supplied via a device 8 of a feeding device 9 that is arranged on the overlay welding head 5.

To repair the weapon barrel 1, the overlay welding head 5 is positioned above the indentation 4 and the laser is powered up. At the same time, the coating material is applied to the internal surface 11 of the weapon barrel 1 just prior to the laser beam 10 and is melted by this laser beam. Thus, a molten bath forms in the surface-near region of the weapon barrel 1, which comprises molten weapon barrel material and coating material that hardens once the laser beam 10 moves on.

The technique is undertaken in the presence of a shielding gas atmosphere, which is inert to the coating material, or also inside a vacuum to prevent any reaction between the molten coating material and the surrounding atmosphere.

After filling in the complete indentation 4, the overlay welding head 5 approaches the next damaged barrel region with the aid of the manipulating device, not shown herein, and again fills in the respective indentation with the coating material.

Once all the damaged regions of the weapon barrel have been coated, the overlay welding head 5 is removed from the weapon barrel 1 and the regions filled in with the coating material are then reworked with a metal-removing method (e.g. a metal-chip removal).

The invention claimed is:

1. A method for repairing the coating damage and/or erosion damage on the internal surface of a weapon barrel comprising providing a weapon barrel having an internal surface which is damaged; providing a coating material at least for said damaged surface; depositing said coating material by overlay welding; and optionally reworking the deposited coating, mechanically, wherein a maximum heat-effect zone in the weapon barrel wall is set to $\leqq 1$ mm by a temperature control, and, wherein the coating material is deposited onto the damaged barrel inner surface by laser-welding or plasma welding.

2. The method of claim 1, wherein the coating material comprises chromium.

3. The method of claim 2, wherein the coating material is in the form of a powder, a ribbon or a wire.

* * * * *